July 9, 1957        H. TANKUS        2,798,750
ROTARY MECHANICAL SEAL AND VIBRATION DAMPENING MEANS THEREFOR
Filed Feb. 4, 1955
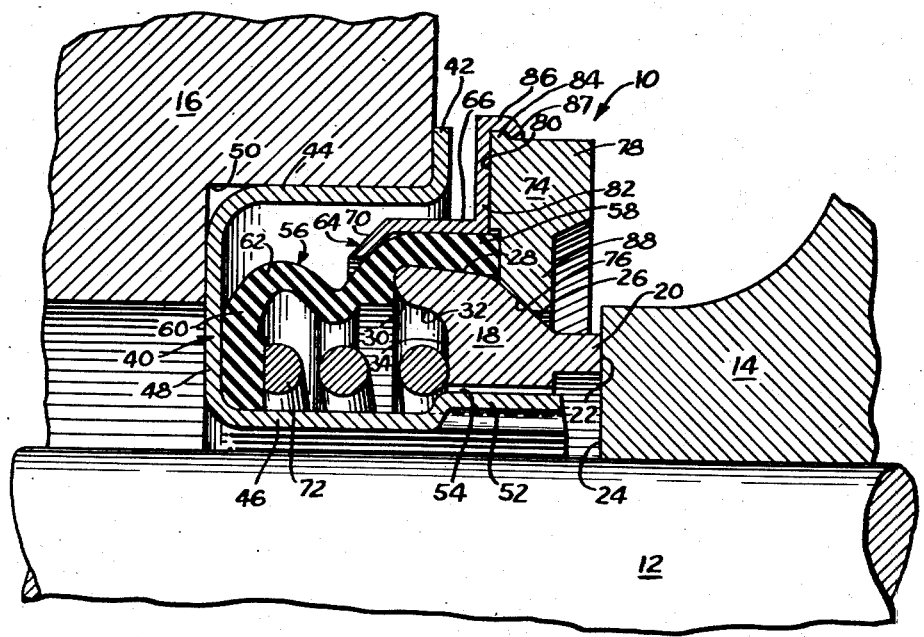
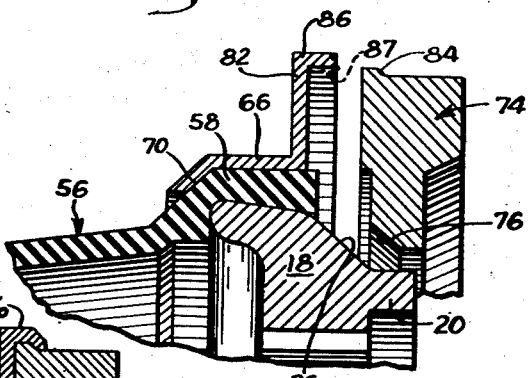
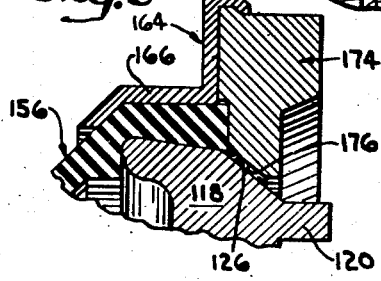
Inventor
Harry Tankus
by: Edward R. Lowndes

# United States Patent Office 2,798,750
Patented July 9, 1957

2,798,750
ROTARY MECHANICAL SEAL AND VIBRATION DAMPENING MEANS THEREFOR

Harry Tankus, Chicago, Ill., assignor to Crane Packing Company, Chicago, Ill., a corporation of Illinois Application February 4, 1955, Serial No. 486,190

6 Claims. (Cl. 288—2)

The improved rotary mechanical seal and vibration dampening means therefor which comprises the present invention has been designed for use primarily in connection with automotive water pumps wherein a shaft, usually the shaft which carries the air circulating fan of the vehicle, passes through the wall of the pump casing. The invention is however capable of other uses and the same may, with or without modification be employed in connection with refrigerating apparatus wherein the shaft passes through the wall of the compressor or the like, as well as in connection with other equipment involving relatively rotating concentric parts one of which is to be sealed with respect to the other.

The invention has for illustrative purposes been shown as being applied to a rotary mechanical seal of the type shown in the patent to Frank E. Payne, No. 2,645,508, dated July 14, 1953, for Rotary Mechanical Seal, now surrendered for purposes of reissue, and the reissue patent to Paul T. Haake Re. 23,898, dated November 23, 1954, for Rotary Mechanical Seal With Telescoping Parts, although it will be understood that the same is capable of use with various other forms of mechanical seals having so-called relatively rotating washer and seat parts.

The prevalence of objectionable squeals or other noises in connection with rotary mechanical seals of the type herein described, may be attributed to various factors and among these are possible misalignment of the relatively rotating washer and seat parts, or vibration of the spring which is employed to hold the sealing washer against the cooperating rotatable seat.

The present invention relates to an improved means for absorbing the torsional oscillations which may be set up in the sealing washer of rotary mechanical seals of the type shown in the above mentioned patents to Payne and Haake, utilizing an inertia member or weight which is affixed to the washer so as to materially increase the moment of inertia on the washer and weight assembly as a whole so that accumulative torsional vibrations are not permitted to pass through the washer and the latter will be effectively dampened so that there will be no transmission of vibration to the spring or bellows member associated with such rotary mechanical seals.

Sealing washers of the type shown in the above mentioned patents to Payne and Haake are formed with forwardly extending nose portions which are usually inwardly and radially offset from the outer cylindrical confines of the washer. The location of the nose piece on the washer establishes a void in the forward regions of the washer and the present inertia member is so constructed that the inner regions of the member substantially fill the void created in the washer in order to insure maximum centrifugal mass in the case of rotating washers and maximum inertia mass in the case of stationary washers. In either event, according to the present invention, a high degree of stability resulting from increased mass of the inertia member is attained.

The provision of a rotary mechanical seal having vibration dampening features of the character briefly outlined above and which are more effective than prior dampening devices of this general type being among the principal objects of the invention, another and equally important object of the invention is to provide a dampening device for seal washers which lends itself to a novel and easy method of application to the washer in the normal course of assembly operations during which the various seal parts are assembled upon one another.

A similar and related object of the invention is to provide an inertia member designed for application to a washer, bellows and ferrule assembly wherein the member, when finally applied to the sub-assembly just mentioned firmly holds the washer in position in the assembly against dislodgement while at the same time reinforcing the ferrule so that the same is incapable of radial expansion and the bellows is more firmly held in position on the washer so that there is no possibility of dislodgement of the bellows due to improper handling of the seal.

Numerous other objects and advantages of the invention not at this time enumerated will become more readily apparent as the nature of the invention is better understood.

In the accompanying single sheet of drawings forming a part of this specification a preferred embodiment of the invention has been shown.

In these drawings:

Fig. 1 is a quarter section taken longitudinally through a seal embodying the principles of the present invention.

Fig. 2 is an exploded view of the certain elements of the seal shown in Fig. 1 showing the method of assembling these parts in accordance with the present invention, and Figure 3 is a fragmentary sectional view similar to Fig. 2 showing a modified form of sub-assembly unit capable of being employed in connection with the present invention.

Referring now to the drawings in detail, the improved seal comprising the present invention is of the so-called "package-type" and is designated in its entirety at 10, the seal being shown in its installed position in a water pump construction including a shaft 12 having an impeller 14 mounted thereon and a casing or housing 16 through which the shaft 12 extends. The seal 10 involves in its general organization a washer 18 having a forwardly extending nose piece 20 on which there is formed a radially disposed seal surface 22 which is lapped substantially flat so as to form a fluid-tight seal with a cooperating running surface 24 provided on the impeller 14, this latter surface being similarly lapped to a substantially flat condition. The washer 18 is formed with a forwardly facing frusto-conical surface 26 and an outer generally cylindrical surface 28 which tapers slightly toward the front of the washer as shown and which merges with a rounded rearwardly facing rim portion 30 which in turn merges with a rearwardly facing recess 32 having a flat bottom 34. The washer 18 is preferably formed of a molded thermosetting resin having dispersed therein metallic particles for better heat conductivity and wear resistance, there being several such materials available for this purpose including the material shown in the patent to Teeple No. 2,326,000, dated August 3, 1943, for Bearing Material.

Concentrically disposed with respect to the washer 18 is a retainer 40 formed of a one-piece metal stamping having an outwardly extending flange or rim portion 42, an outer cylindrical section or wall 44, an inner cylindrical section or wall 46, commonly known as the centerpost of the retainer, and a connecting radial wall 48. The retainer is adapted to be received within a recess 50 provided in the pump housing 16 by a pressed fit.

The cylindrical wall or centerpost 46 telescopically receives the washer 18 thereover and a plurality of driving lugs 52, of which there may be two or more in number, are formed on the centerpost 46 and extend into corresponding recesses 54 provided on the inside of the washer. It will be understood of course that as many such lugs and recesses will be provided as is required to give an even distribution of force around the washer when these lugs assimilate the frictonal thrust developed between the running surfaces 22 and 24. In order to effect a seal between the washer 18 and retainer 40, a tubular sleeve 56 which is made of resilient material such as rubber, either natural or synthetic, or a combination of the two, has one end thereof effectively sealed to the radial wall 48 of the retainer. The tubular bellows 56 includes a thickened forward generally cylindrical portion 58, an inturned flange portion 60 at its rear end and an intermediate section 62 which is flexible and which may assume a folded condition when the seal is in an actual installation as shown. A metal band or ferrule 64 has a cylindrical portion 66 which surrounds the forward thickened portion 58 of the bellows 56 and preloads this portion of the bellows against the outer surface 28 of the washer 18 so as to squeeze the material of the bellows upon this surface 28 and establish an effective fluid seal at this region. A conical flange or rim portion 70 provided at the rear of the ferrule 64 limits the forward axial movement of the ferrule relative to the washer and bellows during assembly operations.

Initial sealing pressure is developed between the two sealing surfaces 22 and 24 by means of a coil spring 72 which surrounds the centerpost 46 and which bears at one end against the flange 60, thus urging the flange into sealing engagement with the opposed inner surface of the radial wall 48 of the retainer, and at its other end against the bottom 34 of the recess 32 provided in the rear face of the washer.

According to the present invention, and in order to stabilize the movements of the washer 18, a stabilizing weight member 74 encircles the washer and has a rearwardly and inwardly facing conical surface 76 designed for face-to-face contact with the conical surface 26 provided on the washer 18. The member 74 is in the form of an inertia member or weight and is formed with a body portion 78, the rear face 80 of which bears against a radial flange 82 provided on the ferrule 64. The body portion 78 is provided with an annular rib 84 at its outside periphery over which a laterally turned flange 86 provided on the radial wall 82 is adapted to be rolled or beaded over the rib 84 as at 87 in order to damp and secure the inertia member 74 firmly in position against the washer 18. The body portion 78 has formed thereon an inwardly extending rib 88 of reduced thickness and on which rib the perviously mentioned conical surface 76 is formed.

Referring now to Fig. 2 wherein the method of assembling the inertia member or weight 74 on the washer 18 is diagrammatically illustrated, the ferrule 64, bellows 56 and washer 18 are first assembled together to provide a subassembly unit as shown in this figure, the method of assembly being substantially as disclosed in reissue patent to Haake mentioned above. The ferrule 64 which is preferably in the form of a sheet metal stamping is aligned with the cylindrical portion 58 of the bellows 56 and this latter portion is in turn aligned with the washer 18. The three parts are then telescoped over one another. The internal dimension of the cylindrical portion 66 of the ferrule 64 and the dimension of the cylindrical surface 28 of the washer 18 are such that the tubular portion 58 of the bellows will be compressed against the washer to insure a fluid-tight seal. The slight taper given to the generally cylindrical surface 28 creates in effect a recess into which the resilient material of the cylindrical portion 58 of the bellows is forced and the excess material which occupies this recess serves to prevent the bellows and ferrule from being withdrawn rearwardly from the washer 18. The inclined portion 70 of the ferrule 64 limits the forward movement of the ferrule over the washer 18. In this manner normal tolerances in the construction of the washer, bellows and ferrule may be accepted in the manufacture of the various parts and in mass production assembly of the parts there will be a minimum number of rejects due to improper fitting of the parts.

The assembly of the washer, bellows and ferrule as just described lends itself admirably to large scale manufacturing methods utilizing a suitable press mechanism whereby the three parts are placed in their relative positions of aligned orientation and pushed into their telescoping relationship by means of male and female operating dies. The mechanism employed is also capable of use in assembling the inertia member 74 on the sub-assembly and, in order to accomplish this, the member 74 is aligned with the sub-assembly as shown in Fig. 2 and the rear face 80 of the body portion 78 of the member 74 is caused to bear against the forward vertical face of the flange 82 on the ferrule 64. Thereafter the flange 86 of the ferrule is beaded inwardly as at 87 over the rib 84 and the beading pressure exerted on the rib 84 serves to hold the conical surface 86 formed on the rib 88 firmly against the mating conical surface 26 provided on the washer 18. The beading operation may be accomplished by the provision of a beading die which constitutes an adjunct to the assembly mechanism for the washer, bellows and ferrule.

In Fig. 3 a slightly modified form of seal assembly has been shown wherein the frusto-conical surface 176 on the inertia member 174 is maintained spaced from the opposed frusto-conical surface 126 provided on the sealing washer 118 so that the inertia member 174 is floatingly supported by a cushion of rubber from the washer 118. It will be understood of course that the sub-assembly of the ferrule 164, bellows 156, washer 118 and inertia member 174 shown in Fig. 3 are designed for utilization in an overall seal assembly such as has been shown in Fig. 1 and in order to avoid needless repetition of description, similar reference numerals of a higher order have been applied to the corresponding parts of the seal assembly in Fig. 3.

It is to be observed that in either form of the invention the solid metal of the vibration dampener 174 extends into the void created at the forward region of the washer 118 by virtue of the inwardly offset nose piece 120 and the inclined face 126. This makes possible a dampening body having a comparatively large mass without unduly increasing its overall diameter. By such an arrangement a very effective transmission of energy between the washer and dampening member will be effected whenever there is an increment of change in the rotational speed of the washer 118 or whenever tortional vibrations are set up in the washer tending to dislodge it from a static condition.

The invention is not to be limited to the exact arrangement of parts shown in the accompanying drawings or described in this specification as various changes in the details of construction may be resorted to without departing from the spirit of the invention. Only in so far as the invention has particularly been pointed out in the accompanying claims is the same to be limited.

What I claim and desire to secure by Letters Patent is:

1. In a seal assembly for relatively rotatable members including a shaft and a housing surrounding the same, in combination, a ring-like sealing washer adapted to be telescopically received over the shaft and having a forwardly facing clamping surface and a forwardly disposed running sealing surface adapted to frictionally bear against a radial surface substantially normal to the shaft and movable with the latter, an elastomeric sealing sleeve having a body portion and a cylindrical portion at the forward end thereof, means for sealing said body portion to said housing, said cylindrical portion of the sleeve surrounding the outer periphery of the washer, a rigid tubular clamping ferrule having a generally cylindrical wall surrounding said cylindrical portion of the bellows and compressing the latter inwardly against the washer, there being an outwardly extending radial flange formed on said ferrule adjacent the forward end thereof, and an inertia member in the form of a ring surrounding said washer and having a rearwardly facing radial surface bearing against said radial flange on the ferrule, the inner regions of said inertia member having a rearwardly facing clamping surface bearing against said forwardly facing clamping surface on the washer, and cooperating means on said inertia member and ferrule for drawing said inertia member rearwardly to effectively clamp the rearwardly facing clamping surface of the inertia member against the forwardly facing clamping surface of the washer.

2. In a seal assembly for relatively rotatable members including a shaft and a housing surrounding the same, the combination set forth in claim 1 wherein said forwardly facing clamping surface on the washer and said rearwardly facing clamping surface on the inertia member are both of frusto-conical configuration.

3. In a seal assembly for relatively rotatable members including a shaft and a housing surrounding the same, in combination, a ring-like sealing washer adapted to be telescopically received over the shaft and having a forwardly facing clamping surface and a forwardly disposed running sealing surface adapted to frictionally bear against a radial surface substantially normal to the shaft and movable with the latter, an elastomeric sealing sleeve having a body portion and a cylindrical portion at the forward end thereof, means for sealing said body portion to said housing, said cylindrical portion of the sleeve surrounding the outer periphery of the washer, a rigid tubular clamping ferrule having a generally cylindrical wall surrounding said cylindrical portion of the bellows and compressing the latter inwardly against the washer, there being an outwardly extending radial flange formed on said ferrule adjacent the forward end thereof, and an inertia member in the form of a ring surrounding said washer and having a rearwardly facing radial surface bearing against said radial flange on the ferrule, the inner regions of said inertia member having a rearwardly facing clamping surface bearing against said forwardly facing clamping surface on the washer, said outwardly extending radial flange on the ferrule having a forwardly extending circumferential flange at the outer rim thereof, said flange being beaded over the periphery of said inertia member and serving to draw the inertia member rearwardly to effectively clamp the rearwardly facing clamping surface of the inertia member against the forwardly facing clamping surface on the washer.

4. In a seal assembly for relatively rotatable members including a shaft and a housing surrounding the same, the combination set forth in claim 3 wherein said forwardly facing clamping surface on the washer and said rearwardly facing clamping surface on the inertia member are both of frusto-conical configuration.

5. In a seal assembly for relatively rotatable members including a shaft and a housing surrounding the shaft, in combination, a ring-like sealing washer adapted to be telescopically received over the shaft and having a forwardly disposed running sealing surface adapted to frictionally bear against a radial surface substantially normal to the shaft and movable with the latter, an elastomeric sealing sleeve having a body portion and a cylindrical portion at the forward end thereof, means for sealing said body portion to said housing, said cylindrical portion of the sleeve surrounding the outer periphery of the washer, a rigid tubular clamping ferrule having a generally cylindrical wall surrounding said cylindrical portion of the bellows and compressing the latter inwardly against the washer, there being an outwardly extending radial flange formed on said ferrule adjacent the forward end thereof, and an inertia member in the form of a relatively heavy ring-like body surrounding said washer and having a rearwardly facing surface bearing against said radial flange on the ferrule, there being a circumferential rib formed on said inertia member at the outer periphery thereof, the outer end of said radial flange provided on the ferrule being beaded over said rib to retain said inertia member in position against the ferrule.

6. In a seal assembly for relatively rotatable members including a shaft and a housing surrounding the same, in combination, a ring-like sealing washer adapted to be telescopically received over the shaft and having a forwardly extending nose piece inwardly offset from the outer periphery of the washer, thus providing an annular void in the forward regions of the washer, said nose piece being formed with a radially disposed running sealing surface adapted to frictionally bear against a radial surface substantially normal to the shaft and movable with the latter, an elastomeric sealing sleeve having a body portion and a cylindrical portion at the forward end thereof, means for sealing said body portion to said housing, said cylindrical portion of the sleeve surrounding the outer periphery of the washer, a tubular clamping ferrule having a generally cylindrical wall surrounding said cylindrical portion of the bellows and compressing the latter inwardly against the washer, there being an outwardly extending radial flange formed on said ferrule adjacent the forward end thereof, and an inertia member in the form of a ring surrounding said washer and having its inner regions extending into the void created in the forward regions of said washer, said inertia member having a rearwardly facing surface bearing against said radial flange on the ferrule, there being an annular rib formed on the outer periphery of said inertia member, the outer rim of said radial flange on the ferrule being beaded over said rib to effectively clamp the rearwardly facing surface of the inertia member against the radial flange on said ferrule.

References Cited in the file of this patent
UNITED STATES PATENTS

| | | |
|---|---|---|
| Re. 23,898 | Haake | Nov. 23, 1954 |
| 2,700,562 | Cole | Jan. 25, 1955 |